United States Patent
Forget et al.

(10) Patent No.: US 9,705,681 B2
(45) Date of Patent: Jul. 11, 2017

(54) SYSTEM AND METHOD FOR ENCRYPTION

(71) Applicant: Cryptomathic Ltd, Cambridge, Cambridgeshire (GB)

(72) Inventors: Guillaume Forget, Grasbrunn (DE); Torben Pryds Pedersen, Aarhus (DK); Peter Landrock, Cambridge (GB)

(73) Assignee: Cryptomathic Ltd., Cambridge, Cambridgeshire (GB)

( * ) Notice: Subject to any disclaimer, the term of this patent is extended or adjusted under 35 U.S.C. 154(b) by 0 days.

(21) Appl. No.: 14/896,911

(22) PCT Filed: Jun. 6, 2014

(86) PCT No.: PCT/GB2014/051749
§ 371 (c)(1),
(2) Date: Dec. 8, 2015

(87) PCT Pub. No.: WO2014/199128
PCT Pub. Date: Dec. 18, 2014

(65) Prior Publication Data
US 2016/0134424 A1    May 12, 2016

(30) Foreign Application Priority Data
Jun. 12, 2013   (GB) .................................. 1310468.2

(51) Int. Cl.
*H04L 9/32* (2006.01)
*G06F 21/42* (2013.01)
*H04L 29/06* (2006.01)

(52) U.S. Cl.
CPC ............ *H04L 9/3247* (2013.01); *G06F 21/42* (2013.01); *H04L 9/3215* (2013.01);
(Continued)

(58) Field of Classification Search
CPC ..................................................... H04L 9/3247
(Continued)

(56) References Cited

U.S. PATENT DOCUMENTS 8,555,347 B2 * 10/2013 De Graaf ............ H04L 61/2015
                                                              713/155
8,805,110 B2 *  8/2014 Rhoads ........................ 382/255
(Continued)

FOREIGN PATENT DOCUMENTS

EP         1364508 B1     6/2006
EP         1959374 A1     8/2008
(Continued)

OTHER PUBLICATIONS

International Preliminary Report on Patentability in corresponding PCT Application No. PCT/GB2014/051749, dated Dec. 15, 2015, 7 pgs.
(Continued)

*Primary Examiner* — Taghi Arani
*Assistant Examiner* — Khalil Naghdali
(74) *Attorney, Agent, or Firm* — Knobbe, Martens, Olson & Bear, LLP

(57) ABSTRACT

A method and system for generating a signature for a user are described. The system comprises a signature server, an initial transaction device for a user and a validation device for a user. The initial transaction device is configured to display a first message M and send a request to the signature server to create a signature for said first message M. The signature server is configured to generate a validation challenge using a second message M' which is based on said first message M' and a first secret shared between said user and said signature server and send said validation challenge to the validation device. The validation device is configured to regenerate said second message M' using said first shared
(Continued)

secret, display said second message M', receive user confirmation that the displayed second message M' corresponds to said first message M, generate a validation code confirming the request to create a signature; and send said validation code to said signature server. Thereafter, said signature server generates the signature for the user for the first message M.

18 Claims, 11 Drawing Sheets

(52) U.S. Cl.
CPC ............ *H04L 9/3234* (2013.01); *H04L 63/08* (2013.01); *H04L 63/0853* (2013.01); *H04L 63/0823* (2013.01); *H04L 63/123* (2013.01); *H04L 63/18* (2013.01); *H04L 2209/56* (2013.01); *H04L 2209/80* (2013.01)

(58) Field of Classification Search
USPC .......................................................... 713/180
See application file for complete search history.

(56) References Cited

U.S. PATENT DOCUMENTS 8,949,708 B2 * 2/2015 Peterson ............... G06F 21/645
715/234
2003/0140252 A1 7/2003 Lafon et al.

FOREIGN PATENT DOCUMENTS

| EP | 1969880 B1 | 5/2012 |
|----|------------|--------|
| WO | WO 99/05628 | 2/1999 |
| WO | WO 03/015370 | 2/2003 |
| WO | WO 2013/013262 | 1/2013 |

OTHER PUBLICATIONS

International Search Report and Written Opinion for International Application No. PCT/GB2014/051749 mailed Oct. 22, 2014 in 10 pages.
UK Search Report for Application No. GB1310468.2 dated Dec. 2, 2013 in 4 pages.

* cited by examiner

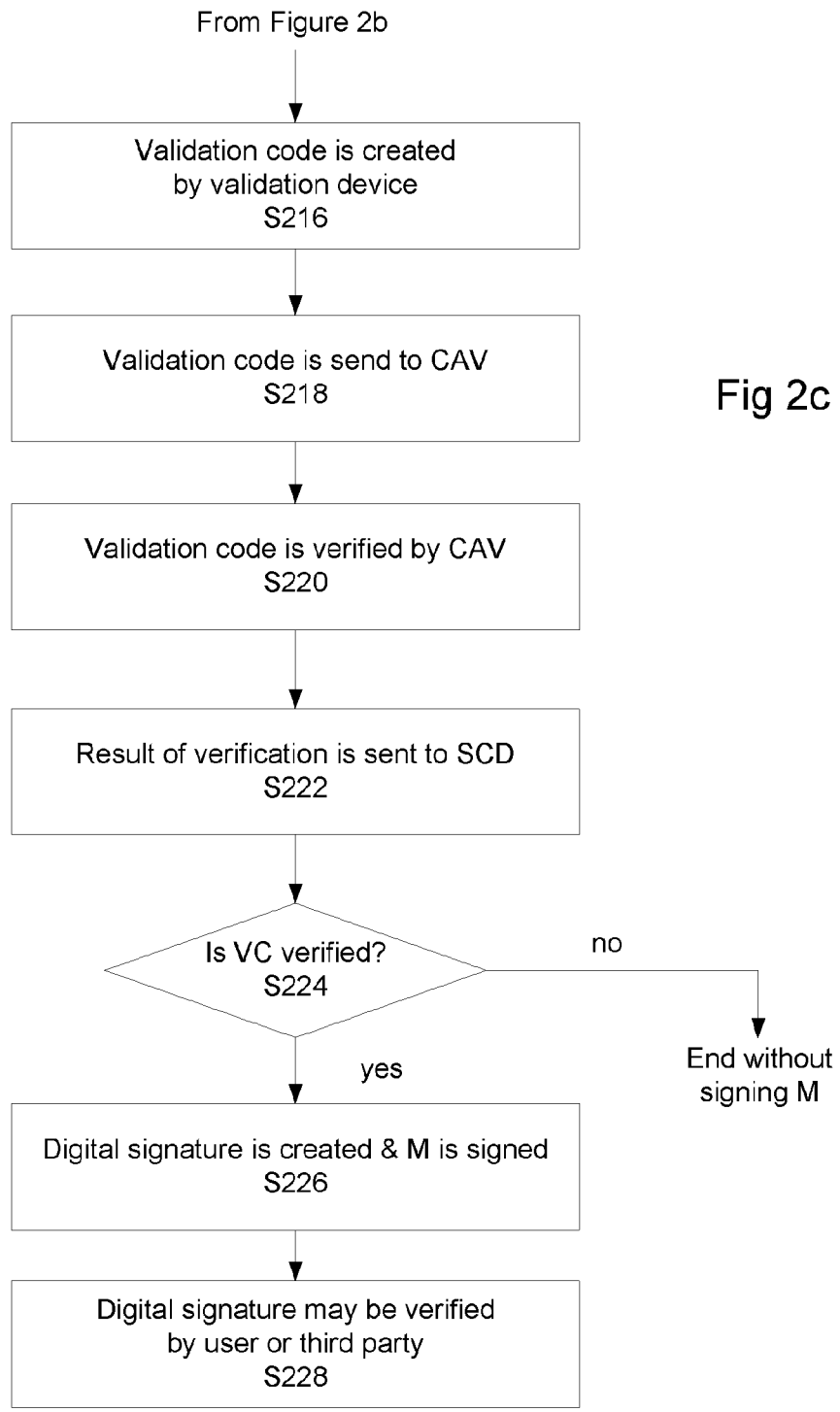

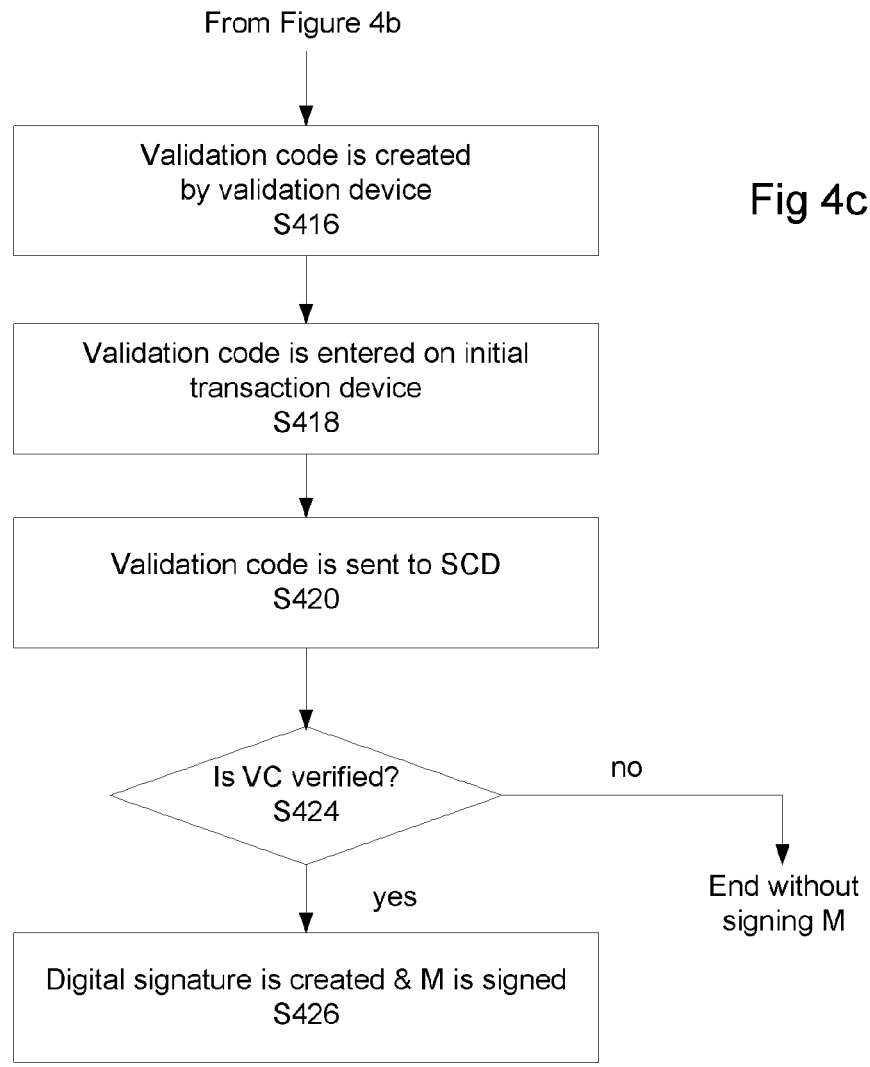

SYSTEM AND METHOD FOR ENCRYPTION

CROSS-REFERENCE TO RELATED APPLICATIONS

This application is the U.S. National Phase under 35 U.S.C. §371 of International Application No. PCT/GB2014/051749, filed Jun. 6, 2014, designating the U.S., which claims priority to United Kingdom Application No. 1310468.2, filed Jun. 12, 2013.

FIELD OF INVENTION

This invention relates to a method and apparatus for requesting and providing a digital signature.

BACKGROUND TO THE INVENTION

Nearly 40 years after the digital signature concept was introduced, there are still a number of challenges in what is known as e-commerce. The goal is a setup where documents and transactions can be digitally signed by a user, and the whole underlying infrastructure provides a sound legal framework which has most of the properties of what has been traditionally accepted for centuries before commerce become electronic. The main challenges in a nutshell are to provide a system which
  1) offers what in a catch phrase is known as "What You See Is What You Sign", or "WYSIWYS", and allows a user to choose to sign "what he sees" in such a manner that:
  2) it is possible to give substantial and convincing evidence (not least in the legal sense) that this particular digital signature on that particular transaction or document was generated at the willful act of that particular uniquely identified user.

The concept of WYSIWYS was introduced by Peter Landrock and Torben Pedersen in "*WYSIWYS? What you see is what you sign?*"—Information Security Technical Report, Elsevier, Vol 3, No 2, 1998.

Another fundamental technical paper is Fiat-Shamir's "How to Prove Yourself: Practical Solutions to Identification and Signature Problems" Advances in Cryptology, CRYPTO'86 Proceedings, Lecture Notes in Computer Science, Springer Verlag 1986. This paper defines the following various schemes which are associated with secure transportation of electronic data:

Authentication Schemes: A can prove to B he is A, but someone else cannot prove to B he is A.

Identification Schemes: A can prove to B he is A, but B cannot prove to someone else that he is A.

Signature Schemes: A can prove to B he is A, but B cannot even prove to himself that he is A.

An authentication scheme is possible just by using symmetric encryption techniques with a shared key. In a software based protocol, the stronger identification schemes required public key techniques. These techniques prove that A's private key was involved, but it does not require that his key is applied to a message with a chosen content. So-called zero-knowledge identification schemes fall in this is category. Finally, in the secure signature scheme the underlying protocol cannot be simulated by B, as opposed to an identification scheme, where this may be possible.

One concept for a signature scheme was that every user would carry around his private key stored on a local signature creation device such as a smartcard or a signing stick featuring a microchip. This approach has some important drawbacks since it requires the availability of a USB port and/or a smart card reader, the poor suitability of using such a peripheral in web based environments and possible compatibility issues between old and modern devices or devices having different brands. It is also essential that the user keeps the signature creation device in a secure location which impedes mobility and ease of use. This approach never really caught on with nation-wide deployments and high usage rates and the derived deployments have been restricted to controlled environments with few users.

An alternative approach for a signature scheme is described in EP 1364508. This scheme uses a central (secure) signature creation device which centrally stores private keys for the creation of a signature for a user while ensuring that their owner retains sole control over them. This approach is now widely used e.g. in Denmark, Norway and Luxemburg, by almost all citizens, business and public services organisations.

During the past 30 years, a number of other commercial solutions have also evolved, which have become more and more advanced, as the attacks have become more and more elaborate. The less secure solutions are solutions providing some degree of session security, which attempts to identify the user only but does not secure the message itself. For example, one early solution relied on a static password being forwarded with the message, later solutions have relied on so-called OTPs, One Time Passwords to be forwarded with the message (but still generated independently of the content of the message).

With the advent of smart phones, a range of new opportunities have appeared. These have been exploited, for example in EP1969880 and EP1959374 which with dedicated hardware in fact will meet the two requirements above in relation to authentication and identification, but at the price of using quite expensive hardware.

However, none of these approaches guarantees the WYSIWYS property—which often is vital to serve its purpose—without further measures such as voice confirmation or the use of separate channels.

One strong realisation of WYSIWYS, albeit perhaps not the most user-friendly is CAP, Chip Authentication Program, developed by Mastercard and later adopted by Visa as DPA (Dynamic Passcode Authentication), which requires a stand-alone cardreader and a debit or credit EMV chipcard. Once the user has provided the details of a payment on e.g. a workstation, his is asked to engage his debitcard or creditcard in the cardreader by keying in his PIN and choosing the function "Sign". He is then required to key in the amount to be paid and the account of the payee, and a message authorisation code (MAC) is generated by his debit or credit card and displayed in the reader. He subsequently keys this in together with his transaction on the work station.

The cryptography behind this is a symmetric encryption system with a key shared between the payment card and the bank backend. So this appears to be an Authentication Scheme with the definition given above. But as the key on the payment card and the bank backend is protected by tamper resistant hardware this is arguably in fact a signature scheme, and is being widely used for electronic banking.

Thus WYSIWYS can be achieved using a combination of symmetric cryptographic techniques and tamper resistant hardware. However, signature schemes based on public key techniques are particularly useful if not indispensible in electronic commerce, where many independent parties communicate with other independent parties, as opposed to electronic banking, where the communication is many to one, namely to the bank. Moreover, none of the techniques and methods described above have addressed the need to provide strong WYSIWYS functionality bound to a legally binding electronic signature carried out by a local or central (Secure) Signature Creation Device, (S)SCD as defined per the European Parliament Directive on Electronic Signature [Directive 1999/93/EC] adopted throughout member states and taken as a reference in many other countries world-wide.

In contrast the main contribution of the present invention is how to generate this WYSIWYS functionality with the newest technology available, which currently includes smartphones, tablet PCs and similar devices.

SUMMARY OF THE INVENTION

According to a first aspect of the invention, there is provided a method of generating a signature on behalf of a user having a first and second user device, the method comprising
- receiving a request from said first user device to create a signature for a first message M;
- generating a validation challenge using a second message M' which is based on the first message M and a first secret shared with said user;
- sending said validation challenge to said user to enable said second user device to regenerate said second message M';
- receiving a validation code from said second user device, said validation code confirming the request to create a signature; and
- generating the signature for the user for the first message M.

According to a second aspect of the invention, there is provided a signature server for creating a signature on behalf of a user who has a first and second user device, the server being configured to
- receive a request from said first user device to create a signature for a first message M;
- generate a validation challenge using a second message M' which is based on the first message M and a first secret shared with said user;
- send said validation challenge to said user to enable said second user device to regenerate said second message M';
- receive a validation code from said second user device, said validation code confirming the request to create a signature; and
- generate the signature for the user for the first message M.

A key feature of the invention is thus the interaction with first and second user devices which are preferably separate from one another. The request for a signature is received from the first user device and is confirmed from the second user device before the signature is created. Moreover, the validation challenge is generated so that the message can be recreated on the second user device in order that a user can see the message before confirming the signature request. Accordingly, the "What You See Is What You Sign" (WYSIWYS) functionality is provided.

The method is a computer-implemented method with the generating steps being carried out on a processor within a signature server and the receiving and sending steps being carried out by an input/output system of the signature server.

The signature server may comprise a signature creation device, for example a secure signature creation device as defined by the European Parliament Directive on Electronic Signature [Directive 1999/93/EC]. The signature creation device (more particularly the processor of the signature creation device) may receive the request to generate the signature and ultimately generate the signature. The signature is preferably an advanced electronic signature, i.e. one which is uniquely linked to the signatory, is capable of identifying the signatory, is created using means that the signatory can maintain under his sole control and is linked to the data to which it relates in such a manner that any subsequent change of the data is detectable.

The signature server may be local or remote from the user. By local, it is meant that the signature creation device is owned by (i.e. held by) the user. By remote, it is meant that the signature creation device is separated physically from the user, e.g. on a central signature server which may be managed by a separate entity.

The signature creation device may also generate the validation challenge and thus a single entity provides both the validation challenge and the signature. However, interaction with two user devices is still required to ensure security. In this arrangement, the signature creation device may be local to the user.

The signature server may comprise a separate authentication and validation server. The authentication and validation server (more particularly the processor of the authentication and validation server) may generate the validation challenge. The authentication and validation server may be remote from or integral with the signature creation device.

The first shared secret may be stored on the signature creation device or the authentication and validation server dependent on which is creating the validation challenge. Accordingly, it is necessary for the user to register the second user device with the signature server (more particularly signature creation device or the authentication and validation server which is creating the validation challenge) to enable sharing of the first shared secret.

The validation challenge is based on the second message M' which in turn is derived first message and thus the validation challenge is derived from the original message. Accordingly, if user is able to regenerate the message M' (or possibly the original message M) from the validation challenge, the user can be ensured that this validation challenge comes from a trusted source. Furthermore, the user can be reassured that the message has not been altered before being presented to the user for validation as part of the signature generation process. The user can thus confirm the request to sign the message. This provides the WYSIWYS functionality.

The second message M' may be identical to the first message M or may be derived from the first message M. M' is designed to be displayed on a handheld device. The second message M' may be a shortened version of the first message M to simplify display to the user for validation purposes. Alternatively, the second message M' may be a different version of the first message M. The second message M' preferably comprises sufficient information from the first message M so that when the second message M' is displayed to the user, the user is able to confirm the second message M' relates to the first message M which he wishes to be signed. M may for instance be a purchase order and M' would be a summary thereof with e.g. PO reference, recipient, amount. The second message M' may be created by the signature creation device or may be created by the first user device. Regardless of where it is created, M' is ultimately received by the signature server to create the validation challenge.

The validation challenge is preferably generated so that said second message M' is derivable from said validation challenge using said first shared secret. For example, said validation challenge may be generated by symmetric encryption by encrypting said second message M' with said first shared secret so that decrypting said validation challenge with said first shared secret regenerates said second message M'. Alternatively, said validation challenge may be generated using a first shared secret in the form of a message authentication code (MAC). Alternatively, the validation challenge may be a digitally signed version of M' which is signed with a first shared secret in the form of a private key associated with the User, the public part of the private key residing in the second user device. Accordingly, it is necessary to preregister the device to exchange or otherwise agree on the first shared secret The validation challenge may be sent direct or indirect to the second user device, e.g. the validation challenge may be sent via the first user device. The method may further comprise reformatting the validation challenge as a barcode (e.g. QR code) which is readable by the second user device. The barcode may be displayed on the first user device to be read by the second user device.

The validation code may be received direct or indirect from the second user device. The validation code may be verified before the signature is created. The verification checks that the validation code has been received from the second user device. The verification may be done by any standard process. Thus, the validation code must be created using information, namely a second shared secret, which is specific to the user, and preferably different to the information used to create the validation challenge.

Before creating the signature, the signature server needs to verify that the validation code is coming from the user. The verification of the validation code may be carried out by the authentication and validation server—where one is used—and the result of the verification may be sent to the signature creation device. If this is the case, the signature creation device may also verify that the result has come from the authentication and validation server. Alternatively, the verification of the validation code may be carried out by the signature creation device itself. If a second shared secret is used to create the validation code, this is also stored on the device which verifies the validation code. Accordingly, it is necessary to exchange or otherwise agree on the second shared secret as part of the preregistration of the device.

The user preferably has at least two devices, the first user device and the second user device. Alternatively, the user may have a single device which merges the functionality of the first and second user devices. Thus, the first user device may also be the second user device. This single device must be adapted to provide the dual functionality, for example, the single device may be able to handle two independent channels and/or have a trusted graphical user interface. The first user device sends out the request for a signature. The second user device regenerates the second message M' from the validation challenge and creates a validation code confirming the request to create a signature. The first user device may be termed an initial transaction device and the second user device may be termed a validation device; these terms are used interchangeably throughout the specification. The initial transaction device may be any electronic device such as workstation, a laptop computer, a tablet or smart phone. Similarly, the validation device may be any electronic device but is preferably a different electronic device to the initial transaction device.

According to another aspect of the invention, there is provided a validation device for a user to validate a signature request for a first message M, the validation device being configured to receive a validation challenge from a signature creation device, the validation challenge having been created using a second message M' which is based on the first message M and a first secret shared between said signature creation device and said validation device;

generate the second message M' from the validation challenge using the first shared secret;

display the second message M' to the user;

receive user confirmation that the second message M' corresponds to the first message M;

generate a validation code confirming the request to create the signature; and output the validation code.

According to another aspect of the invention, there is provided a method of requesting a signature for a first message M from a signature creation device, the method comprising receiving a validation challenge from the signature creation device, the validation challenge having been created using a second message M' which is based on the first message M and a first secret shared between said signature creation device and said user;

generating the second message M' from the validation challenge using the first shared secret;

displaying the second message M' to the user;

receiving confirmation that the second message M' corresponds to the first message M;

generating a validation code confirming the request to create the signature; and outputting the validation code.

The features described above in relation to the first and second aspects of the invention also apply to these aspects of the invention which relate to the device and steps taken by the user. For example, the validation challenge and the second message M' may have been generated and transmitted as described above.

The second message M' may be generated from the validation challenge by decryption. For example, the first shared secret may be a symmetric key. Alternatively, the validation challenge may be validated using the first shared secret by verifying a message authentication code (MAC) obtained from the validation challenge. Alternatively, the first shared secret may be a private key associated with the User, the public part of the private key residing in the second user Device. In this case, the second message M' may be generated by applying the public part of the private key to the validation challenge.

The validation code must be created using information which is specific to the user, and preferably different to the information used to create the validation challenge, for example a second shared secret. The validation code may be generated using various standardised methods including OATH challenge response algorithm (OCRA) [described in RFC 6287-ISSN 2070-1721] or equivalent proprietary technology such as MasterCard CAP, Visa CodeSure [WO2013013262] or Vasco Digipass challenge response based mechanisms. The validation code may be generated using encryption with the second secret being a symmetric key shared between the Validation Device and the Central Authentication and Validation Server or signature creation device (depending on which device is verifying the validation code). The validation code may also be a signed response with a nonce to avoid replay attacks.

As described above, the signature server may comprise a signature creation device and/or an authentication and validation device. Where there is an authentication and validation device, the validation device may receive the validation challenge from the authentication and validation device and may output the validation code to the authentication and validation device. In this case, it is necessary to preregister the validation device with the authentication and validation device to ensure the necessary secrets are shared. Alternatively, where authentication is carried out by the signature creation device itself, the validation device may receive the validation challenge from the signature creation device and may output the validation code to the signature creation device.

The full system for the invention comprises a signature server, a first user device (initial transaction device) and a second user device (validation device). According to another aspect of the invention, there is provided a system for providing a signature for a message M, the system comprising a signature server as described above, a first user device as described above and a second user device as described above.

According to another aspect of the invention, there is provided a system comprising a signature server, an initial transaction device for a user and a validation device for a user, the initial transaction device being configured to
    display a first message M; and
    send a request to the signature server to create a signature for said first message M;
the signature server being configured to
    generate a validation challenge using a second message M' which is based on said first message M' and a first secret shared between said user and said signature server; and
    send said validation challenge to the validation device;
the validation device being configured to
    regenerate said second message M' using said first shared secret; and
    display said second message M';
    receive user confirmation that the displayed second message M' corresponds to said first message M;
    generate a validation code confirming the request to create a signature; and
    send said validation code to said signature server;
    whereby said signature server generates the signature for the user for the first message M.

Similarly, according to another aspect of the invention, there is provided a method comprising
    displaying a first message M on a first user device;
    sending a request from said first user device to a signature server to create a signature for said first message M;
    creating a second message M' which is based on the first message M;
    generating a validation challenge using said second message M' and a first secret shared between said user and said signature server;
    sending said validation challenge to a second user device;
    regenerate said second message M' on said second user device using said first shared secret;
    displaying said second message M' on said second user device;
    receiving user confirmation that second message M' corresponds to said first message M;
    generating a validation code confirming the request to create a signature;
    sending said validation code from said second user device to said signature server; and
    generating the signature for the user for the first message M.

The invention further provides processor control code to implement the above-described systems and methods, for example on a general purpose computer system or on a digital signal processor (DSP). The code is provided on a physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings, in which:

FIGS. 2b and 2c are a flowchart for the implementation shown in FIG. 2a;

FIGS. 3b and 3c are a flowchart for the implementation shown in FIG. 3a;

FIGS. 4b and 4c are a flowchart for the implementation shown in FIG. 4a;

DETAILED DESCRIPTION

Figure 1A:
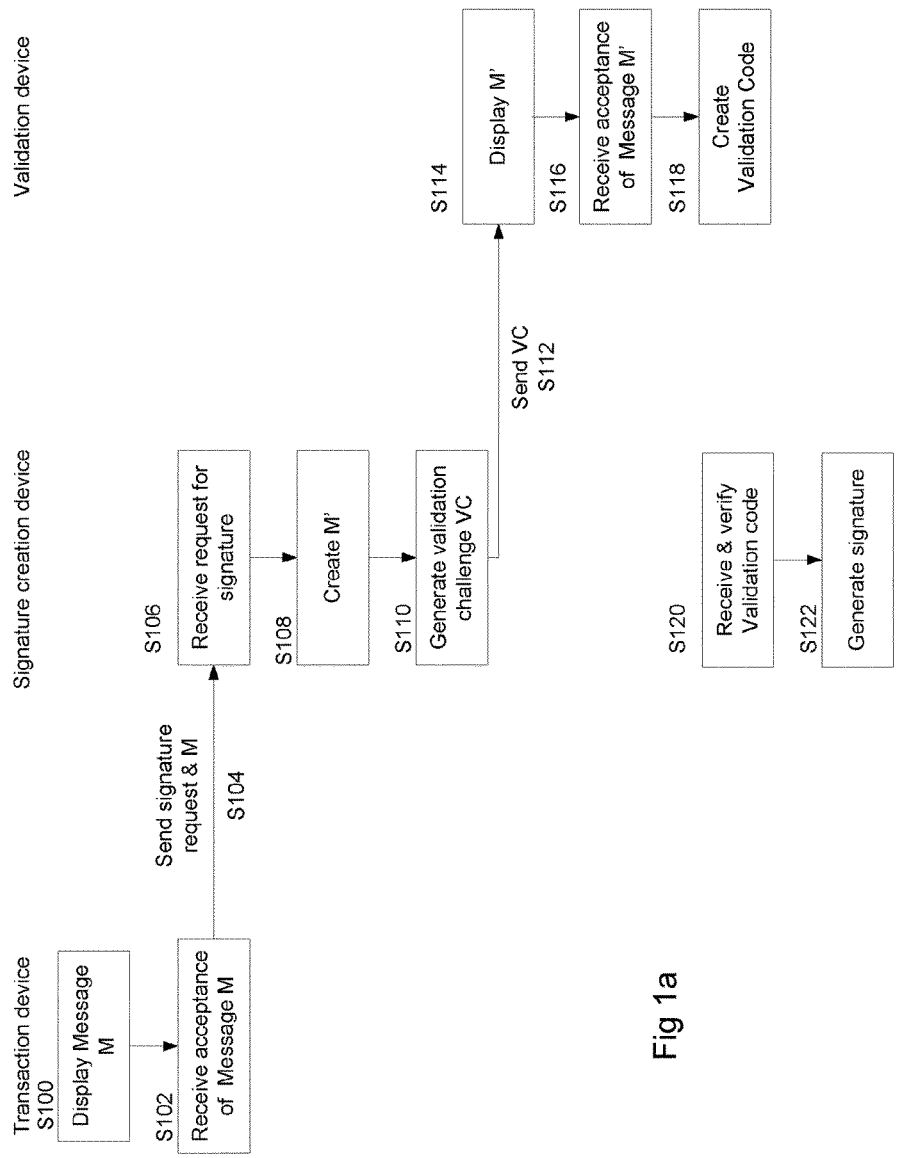
FIG. 1a is a flowchart of the steps taken by the various devices in the system.

FIG. 1a is a flowchart showing how this new invention provides strong 'WYSIWYS' functionality using multiple devices. The system comprises three key devices; a signature creation device (SCD) and preferably two devices held by a user here termed an initial transaction device and a validation device. As explained in more detail with reference to FIGS. 2a to 4a; the signature creation device is where the actual digital signature generation is carried out. The signature creation device may be a central SOD such as a signing server or a local signature creation device such as a smart card or a signing stick. The initial transaction device may be any electronic device such as workstation, a laptop computer, a tablet or smart phone. Similarly, the validation device may be any electronic device but is preferably a different electronic device to the initial transaction device. There are two independent communication channels, one with each of the initial transaction device and the validation device to achieve WYSIWYS with an adequate level of security to avoid the message being altered without instant detection. If only one user device was used, it would have to have additional tamper resistant features, such as a trusted GUI (Graphical User Interface).

Figure 1B:
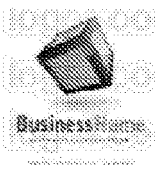
FIG. 1b is a sample message.

Initially, at step S100, the user uses the Initial Transaction Device to identify a specific message M that he is prepared to commit to with a digital signature. The message may be a transaction, document or purchase order in electronic form. An example of a message in the form of a purchase order is shown in FIG. 1b.

As the Initial Transaction Device may be an insecure platform, the user typically cannot commit to signing the message on this device because an attacker on the Initial Transaction Device may replace the message with another one. Thus, once the user has accepted the message M (S102) and wishes to sign the message, a request for signature creation to the signature creation device (S104).

Once the SCD has received a request to sign a message M (S106), the SCD will not create the signature until it has received evidence that the user has committed to signing this particular message. In essence, this is achieved by sending the message (or parts of it) to the Validation Device. Thus, at step S108, a derived version M' of the message is created. M' may be the whole of the message M or may be created from extracts of the information within the message M. Thus, for the example of FIG. 1 b, the highlighted fields 11 may be used to form M'.

Figure 2A:
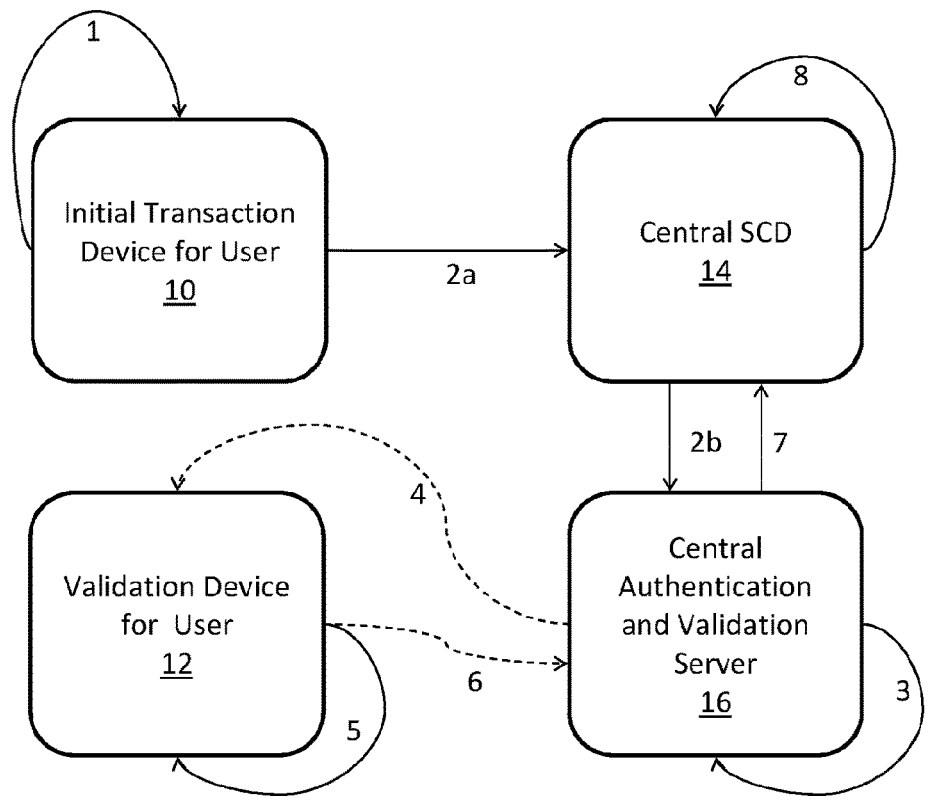
FIG. 2a is a schematic diagram for one arrangement of the system showing the flow of information through the system.
Figure 3A:
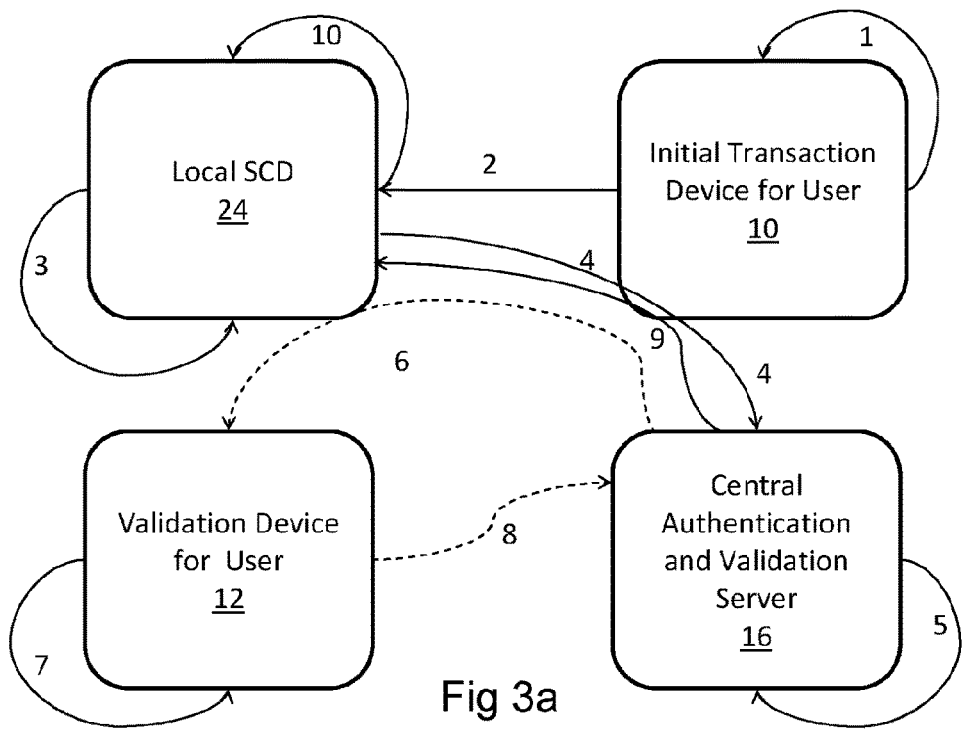
FIG. 3a is a schematic system diagram for another arrangement of the system.
Figure 3B:
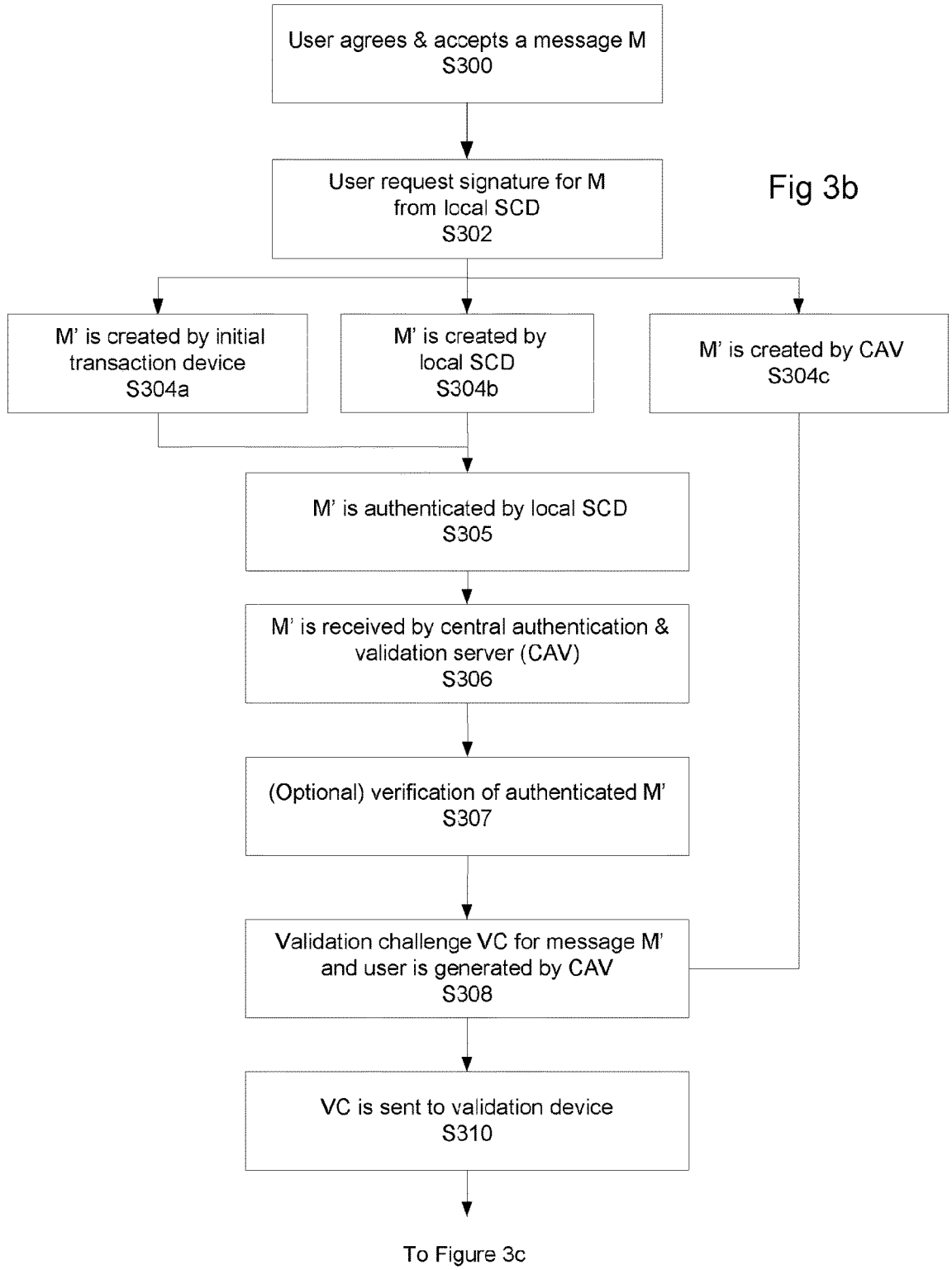
Figure 3C:
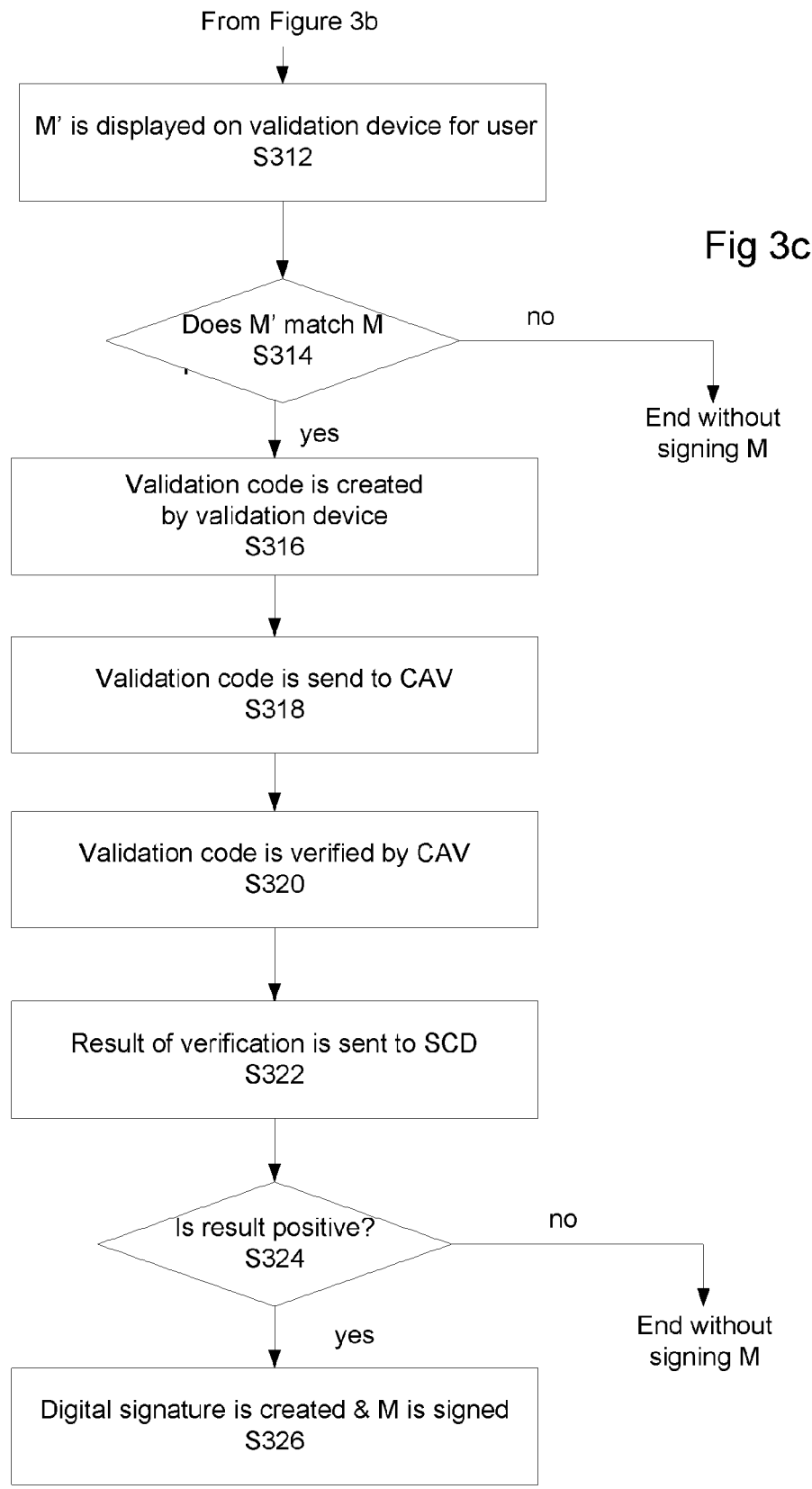
Figure 4A:
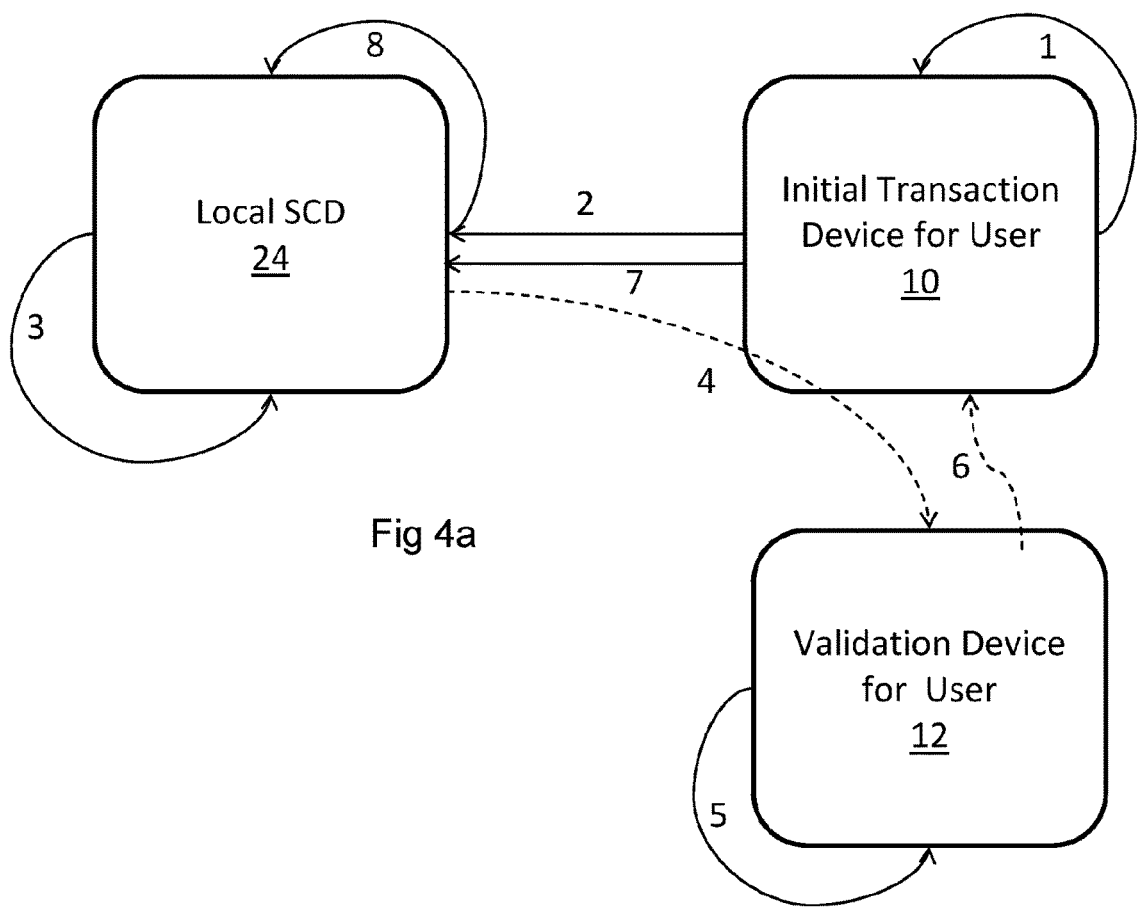
FIG. 4a is a schematic system diagram for another arrangement of the system.
Figure 4B:
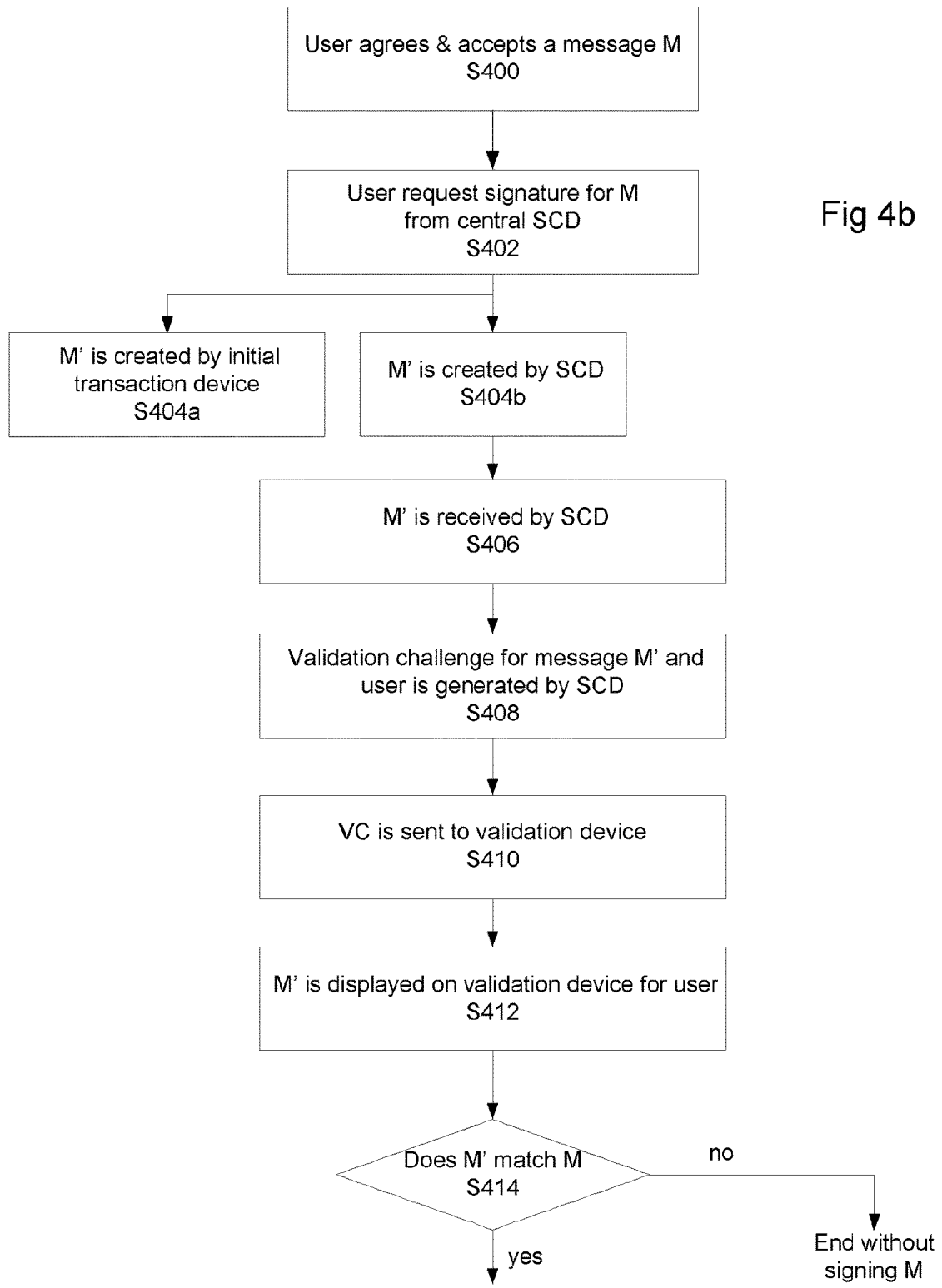

M' is shown in FIG. 1a as being created by the signature creation device but it could be created by the transaction device or another device within the system as shown in FIGS. 2b, 3b and 4b below. It just needs to be received at the signature creation device for generation of the validation challenge (S110). As explained in more detail below, the validation challenge is also based on or derived from the message.

The validation challenge is sent to the validation device (S112). By the creation of a validation challenge which is derived from the original message, the user can be ensured that this derived message comes from a trusted source with acceptable reasons to believe that it has not been altered before being presented to the user for validation as part of the signature generation process. The Validation Device (which may include a specific application running on the device) displays the derived version of the message M' (S114). If the user recognizes the transaction, he approves it on the Validation Device (S116) in which case a unique validation code is generated (S118). This validation code is received at the signature creation device (S120) and must be verified before the transaction is signed by the central or local SCD (S122). The verification ensures that the signature can only be generated if this verification has been successful.

The innovation allows for a number of realisations depending on whether the SCD is a central signing server or a local device (smart card, USB signing stick). In the latter case various realisations for verifying the unique validation code are possible.

Processes must be set up for enrolling the Validation Device and personalising it with some symmetric or asymmetric keys. This is a standard technique which is well known in the art and is thus not described in detail.

Figure 2C:
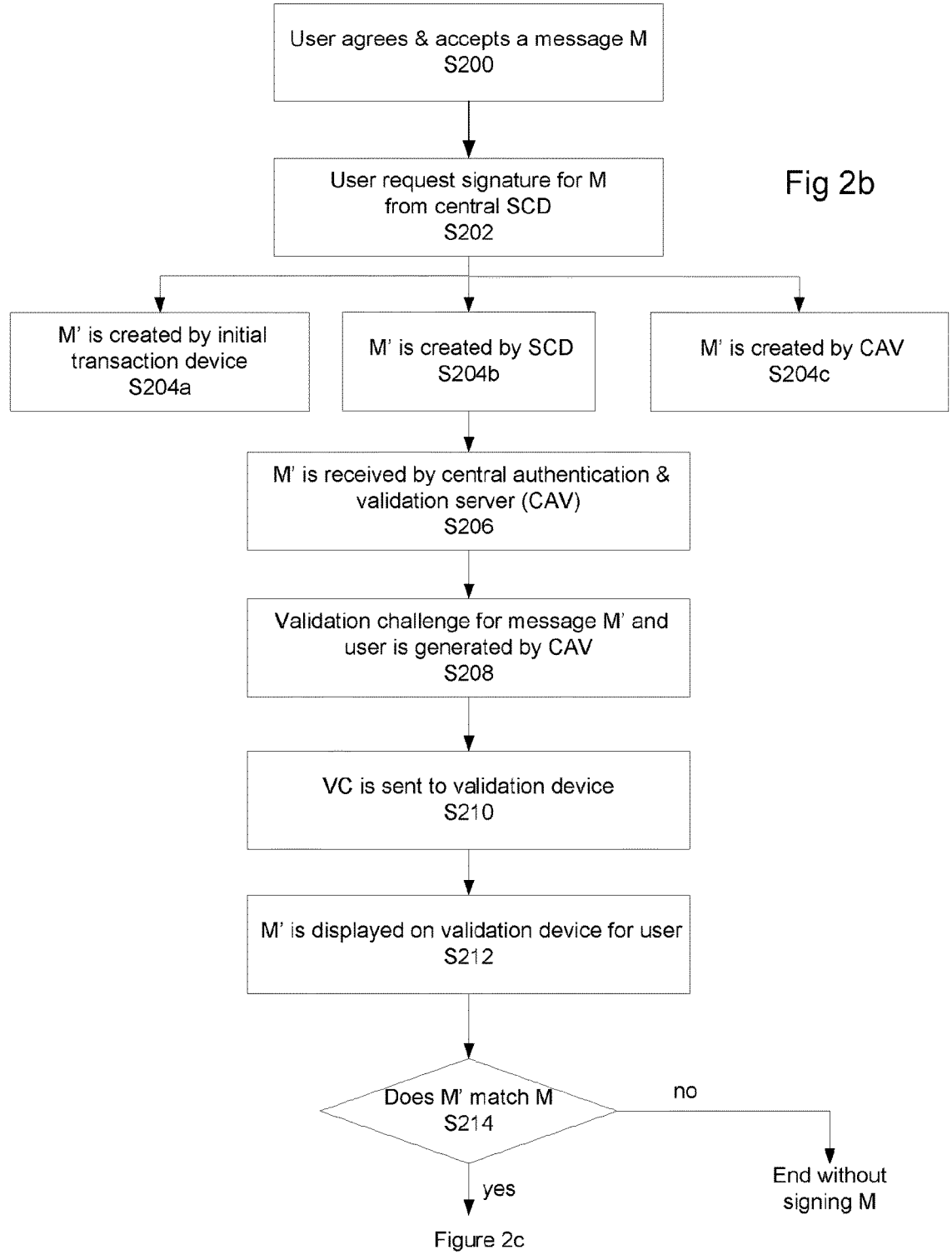

FIGS. 2a to 2c show one arrangement for providing strong 'WYSIWYS' functionality using multiple devices. As shown in FIG. 2a, this arrangement comprises the user devices: an initial transaction device 10 and a validation device 12. These devices are independent of one another as part of the 'WYSIWYS' functionality. The arrangement also comprises a central system which is located remotely from the user devices and which comprises a central signature creation device 14 and a central authentication and validation server 16. The central signature creation device 14 is connected to the initial transaction device 10 and the central authentication and validation server 16 is connected to the validation device 12. Accordingly, each of the user devices 12, 14 has a separate independent communication channel with the central part of the system.

In FIG. 2a, the signature creation device 14 and the central authentication and validation server 16 are shown as two separate entities which are connected to each other, preferably via a secure connection. This merely indicates that each entity has a different function or role in the process. It will be appreciated that the separate functions of the signature creation device 14 and the central authentication and validation server 16 may also be provided by a single entity, e.g. a single signature server.

The flow of information around the system is indicated by the numbers 1 to 8 and is explained in more detail in relation to FIGS. 2b and 2c. Initially, as shown by arrow 1, the User agrees on the content of and accepts a message M which is being displayed on his Initial Transaction Device (S200). Acceptance means that he is prepared to commit to the message with a digital signature. Said message M may optionally be presented on a client browser of the Initial Transaction Device which is receiving web HTML pages from a remote web server controlled by an application provider.

As shown by arrow 2a, the User contacts the central SCD or signature server to request a signature for message M or a hashed version thereof (S202). A derived version of the message, termed M', is created. M' may be identical to M or derived from M but has essentially the same content. M may for instance be a purchase order and M' would be a summary thereof with e.g. PO reference, recipient, amount. As shown by steps S204a, S204b, S206c, M' is computed by the Initial Transaction Device, the SCD or the central Authentication and Validation Server. Regardless of where it is created, as indicated by arrow 2b, there is communication between the central SCD and the central Authentication and Validation server to ensure that the central Authentication and Validation Server ultimately receives M' (S206).

As indicated by arrow 3 and S208, a validation challenge $VC_{M',User}$ is generated by the central Authentication and Validation Server for message M' and the User associated with M' (and hence the original message M). This validation challenge is a cryptographically secured function of M' and may be generated using any known standard techniques. The validation challenge needs to protect the message M' with information which is unique to the User and the central Authentication and Validation Server so that the User can be certain that the validation challenge is based on the original message M and is coming from a trusted source. Moreover, the validation device needs to be able to retrieve M' from the validation challenge. For example, the validation challenge may be generated using encryption under a symmetric key which is shared by both the Authentication and Validation Server and the Validation Device. Similarly, the validation challenge may be generated using a message authentication code (MAC) which is shared by both the Authentication and Validation Server and the Validation Device. Alternatively, the validation challenge may be a digitally signed version of M' which is signed with a private key associated with the User, the public part of the private key residing in the Validation Device. It will be appreciated that the generation of the validation challenge requires that the Validation Device has been registered or otherwise linked with the central Authentication and Validation Server to share the unique information (e.g. symmetric key, public/private key or MAC) at an earlier stage to enable the validation challenge to be generated.

As shown by dashed arrow 4 and step S210, the validation challenge $VC_{M',User}$ is sent to the Validation Device. The dashed line indicates that the connection between the Validation device may be indirect, e.g. via the Initial Transaction Device, or may be direct as described below. Moreover, the validation challenge may be reformatted before transmission. For example, the validation challenge may be reformatted as a standardised quick response (QR) Code [ISO/IEC18004] or similar barcode which is readable by an appropriate device. The reformatted validation challenge $VC_{M',User}$ may be sent to the Initial Transaction Device and displayed on the screen so that it may be captured and read by the Validation Device, e.g. on a camera controlled by the custom app residing on the Validation Device.

Alternatively, the validation challenge may be transmitted directly over the network, e.g. where there is a custom app residing on the Validation Device, a User may be able to enter a command push which ensures that the validation challenge $VC_{M',User}$ reaches the Validation Device. In such case, it is valuable to protect the access to the app by a PIN or a password or an authentication pattern to ensure that the user is physically present at the time of the validation. One way to ensure that the user is physically present is to send a request over the network for the user to start the app so that the validation challenge $VC_{M',User}$ can be retrieved from the central Validation and Authentication Server and made available to the Validation Device app.

Regardless of how the validation challenge is transmitted, once it is received at the validation device, the validation challenge is used to recreate the message M' so that M' can be displayed on the Validation Device screen (S212). The method for retrieving M' depends on the method of creation for the validation challenge. For example, M' may be retrieved by successful MAC validation or by decryption using symmetric cryptography or asymmetric cryptography techniques.

As indicated by arrow 5, at this point in the process, the user can read message M' on his Validation Device and verify that it matches the message M that he is committed to sign (S214). For example, in the example above, where M is a purchase order and M' would be a summary thereof with information in important fields e.g. PO reference, recipient, amount; the user would be presented with the information from the fields to identify M. A correct display of message M' on the Validation Device gives the user both evidence that the content of the message has not been altered since it was received by the central SCD and evidence that the Validation Challenge comes from a trusted source since retrieval of M' has been successfully completed. If this effectively is the case, the user may approve or validate M' and the Validation Device app will compute a unique validation code (S216). If M' does not match, the process is terminated without a signature being created. The validation code may be generated using various standardised methods including OATH challenge response algorithm (OCRA) [described in RFC 6287-ISSN 2070-1721] or equivalent proprietary technology such as MasterCard CAP, Visa CodeSure [WO2013013262] or Vasco Digipass challenge response based mechanisms. The validation code is thus preferably generated using symmetric cryptography using another device specific key shared between the Validation Device and the Central Authentication and Validation Server. The validation code may also be a signed response with a nonce to avoid replay attacks. The validation code must be created using information which is specific to the user, and preferably different to the information used to create the validation challenge. The central Authentication and Validation Server needs to be certain that the validation code is coming from the validation device. However, unlike the validation challenge, it is not essential that the central Authentication and Validation Server recreates any part of the information within the validation code. Accordingly, asymmetric schemes may also be used.

As shown by dashed arrow 6 and step S218, the validation code is sent back to the central Authentication and Validation Server. This may be done indirectly, for example via the Initial Transaction Device. In one scenario, the user manually types in the validation code on the Initial Transaction Device for it to be re-routed to the central Authentication and Validation Server via the central SCD. Alternatively, the validation code may be sent directly over the network from the validation device to the central Authentication and Validation Server thereby avoiding the code to be typed-in by the user.

At step S220, the validation code is verified by the Central Authentication and Validation Server. The verification is done using any standard technique, for example using OATH OCRA as described in RFC 6287. As indicated by arrow 7 and S222, the result of this verification is then securely sent to the central SCD (if the two are physically different).

Finally, as indicated by arrow 8, the central SCD checks the result of the verification of the validation code (S224). This check includes confirming that the response from the Central Authentication and Validation Server is correctly authenticated and confirming that the result of the verification is positive. If this check is not correct, the process is terminated without signing the message. Alternatively, if all is in order, the digital signature is generated for message M using the central SCD of User (S226).

As a final step, the signature generated may be verified by the user or any relying party using legacy methods (S228). In case of disputes the log of the central Authentication and Validation Server may be used to create a system proof that the user has committed to the signature using the Validation Device.

FIG. 3a shows a variation of the arrangement of FIG. 2a in which the central signature creation device is replaced by a local signature creation device 24. By local, it is meant that the signature creation device is owned by (i.e. held by) the user, e.g. a USB stick or dongle. All other devices are the same and thus the same numbering is used. Furthermore, as explained in more detail below, many of the steps in the process are similar and thus the steps common to both are described in less detail in relation to this embodiment. The flow of information around the system is indicated by the numbers 1 to 10 and is explained in more detail in relation to FIGS. 3b and 3c.

As in the previous arrangement, as shown by arrow 1, the User agrees on the content of and accepts a message M which is being displayed on his Initial Transaction Device (S300). Similarly, as in the previous arrangement, as shown by arrow 2, the User contacts the signature creation device to request a signature for message M (S302). The key difference is that the request is sent to the local signature creation device.

Again a derived version of the message, termed M', is created by the Initial Transaction Device (S304a), the SCD (S304b) or the central Authentication and Validation Server (S304c). However, in contrast to the previous arrangement, if M' is generated by the Initial Transaction Device (S304a) or the SCD (S304b), the message M' is authenticated by the local SCD (S305) before it is sent to the central Authentication and Validation server to ensure that the central Authentication and Validation Server (S306) can trust the message M'. The authentication can be done using any known technique, e.g. signing. In this arrangement, there is no secure connection between the SCD and the central authentication and validation server. Accordingly, the authentication ensures that the central Authentication and Validation Server can trust that the message M' has been received from the local SCD.

Before creating the validation challenge as indicated by arrow 5, the central Authentication and Validation Server may thus perform a number of optional verifications to ensure that M' comes from the SCD of the User (S307). These optional steps may be carried out by the hardware security module (HSM) or security compound of the central Authentication and Validation Server. These verifications may ensure that the correct certificate was selected by the User, that the certificate is valid and that the local SCD is connected and functional before it performs signature. Once these optional verifications are completed, a validation challenge $VC_{M',User}$ is generated (S308) by the central Authentication and Validation Server for message M' and the User associated with M'. This validation challenge is generated as described above.

The next few steps are as described above. Thus, as shown by dashed arrow 6 and step S310, the validation challenge $VC_{M',User}$ is sent directly or indirectly to the Validation Device. Regardless of how the validation challenge is transmitted, once it is received at the validation device, the validation challenge is used to recreate the message M' so that M' can be displayed on the Validation Device screen (S312). As indicated by arrow 7, at this point in the process, the user can read message M' on his Validation Device and verify that it matches the message M that he is committed to sign (S314). The Validation Device will then compute a unique validation code (S316) as described above. As shown by dashed arrow 8 and step S318, the validation code is sent back directly or indirectly to the central Authentication and Validation Server.

As in the previous arrangement, at step S320, the validation code is verified by the Central Authentication and Validation Server. However, as indicated by arrow 9 and S322, the result of this verification is then sent securely to the local SCD (rather than the central SCD of FIG. 2*a*). The secure transmission may be achieved by known techniques, e.g. by signing and/or encrypting the result of the verification. Finally, as indicated by arrow 10, the central SCD checks the result of the verification of the validation code (S324). This check includes confirming that the response from the Central Authentication and Validation Server is correctly authenticated and confirming that the result of the verification is positive. If this check is not correct, the process is terminated without signing the message. Alternatively, if all is in order, the User can be confident that it actually corresponds to the message M' he approved on the validation device so that message M (or a hash thereof) may ultimately be signed.

Thus the digital signature is generated for message M using the local SCD (S326). Optionally, the response from the Central Authentication and Validation Server and/or validation code may be attached as a signed signature attribute. As before, the signature generated may be verified by the user or any relying party using legacy methods. In case of disputes the log of the central Authentication and Validation Server may be used to create a system proof that the user has committed to the signature using the Validation Device.

The above arrangement has the disadvantage that despite having a local signature creation device, a central Authentication and Validation Server is required. FIG. 4*a* shows a variation of the arrangement of FIG. 3*a* in which the local signature creation device 24 provides the functionality of the central Authentication and Validation Server. In this arrangement, all operations are completed locally without requiring any network connection. The signature creation device 24 validates the validation code before making the signature on M. This ensures that the local signature creation device can only be used to create signatures on messages that have been displayed and approved on the Validation device 12. By local, it is meant that the signature creation device is owned by (i.e. held by) the user, e.g. a USB stick or dongle. The Initial Transaction and Validation devices are the same as before and thus the same numbering is used. Furthermore, as explained in more detail below, many of the steps in the process are similar and thus the steps common to both simply refer to the previous description. The flow of information around the system is indicated by the numbers 1 to 8 and is explained in more detail in relation to FIGS. 4*b* and 4*c*.

As in the previous arrangement, as shown by arrow 1, the User agrees on the content of and accepts a message M which is being displayed on his Initial Transaction Device (S400). Similarly, as in the previous arrangement, as shown by arrow 2, the User contacts the local signature creation device to request a signature for message M (S302). Again a derived version of the message, termed M', is created by the Initial Transaction Device (S404*a*) or the SCD (S404*b*).

In contrast to the previous arrangements, as indicated by arrow 3, the local SCD rather than the central Authentication and Validation Server generates a validation challenge $VC_{M',User}$ (S408) for message M' and the User associated with M'. This validation challenge is generated using the same mechanisms described above; the only difference is that they are carried out on the local SCD rather than the central Authentication and Validation Server.

As in the previous arrangement and as shown by dashed arrow 4 and step S410, the validation challenge $VC_{M',User}$ is sent directly or indirectly to the Validation Device. Regardless of how the validation challenge is transmitted, once it is received at the validation device, the validation challenge is used to recreate the message M' so that M' can be displayed on the Validation Device screen (S412). As indicated by arrow 5, at this point in the process, the user can read message M' on his Validation Device and verify that it matches the message M that he is committed to sign (S414). The Validation Device will then compute a unique validation code (S416) as described above.

In this arrangement, there is no central Authentication and Validation Server and thus the validation code cannot be sent there for verification. Accordingly, rather than the validation code being sent direct from the validation device to the local SCD, the validation code is displayed on the validation device and a user inputs the validation code into the initial transaction device. This is shown by dashed arrow 6 and S418. Arrow 7 and S420 show that the validation code is then sent from the Initial Transaction Device to the local SCD. Thus, the validation code is indirectly sent from the validation device to the local SCD. The validation code may be sent as part of the request to the local SCD to sign the message M.

In contrast to the previous arrangements, at step S424, the validation code is verified by the local SCD. Accordingly, in this arrangement, the Validation Device and the local SCD need to be registered with each other so that they share a private key or similar secret which can be used so that the local SCD can confirm that the validation code is from the Validation Device. The authentication between the local SCD and Validation Device may use any known methods. For example, the private key may be a symmetric key, i.e. a key which can be used to both encrypt plaintext to create ciphertext and decrypt the ciphertext to return to the plaintext. The private key may be exchanged in an initialisation phase by entering a preferably long password or pass sequence on both the local SCD and the Validation Device. However, other exchanges of the private key are possible. Once the private key has been stored, the request for signature may also include an access code (e.g. PIN) which is needed for using the private key in the local SCD.

If all is in order following the verification process, the User can be confident that the validation code actually corresponds to the message M' he approved on the validation device so that message M (or a hash thereof) may ultimately be signed. Thus the digital signature is generated for message M using the local SCD (S426). Optionally, M' and/or the validation code may be attached as a signed signature attribute.

Figure 5A:
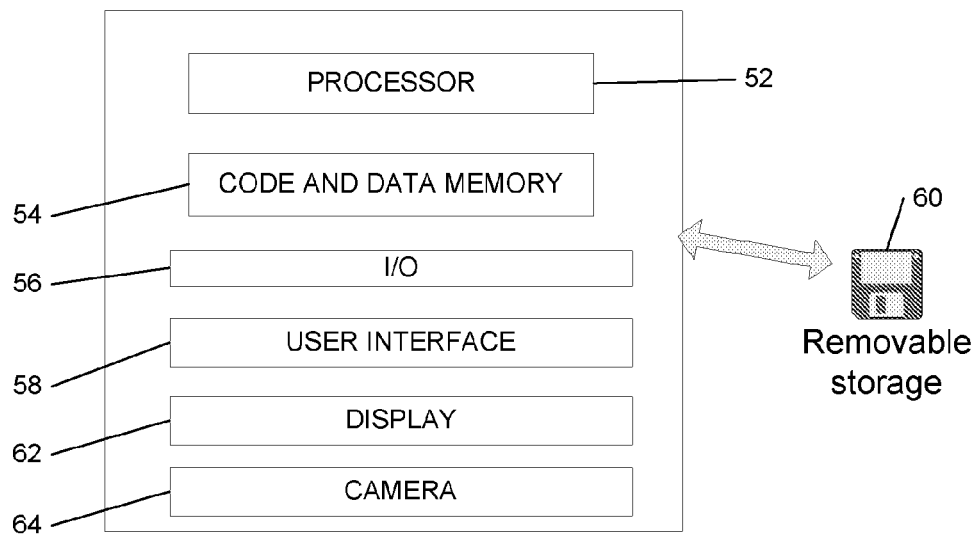
FIG. 5a is a schematic block diagram showing the components of a user device.

As described above, the Validation Device and the Initial Transaction Device may be any form of electronic device which has been modified (e.g. programmed or configured) by software to be a special-purpose computer to perform the functions described herein. FIG. 5a schematically shows the components of either the Validation Device or the Initial Transaction Device. Each comprises a processor 52 coupled to code and data memory 54, an input/output system 56 (for example comprising interfaces for a network and/or storage media and/or other communications), a user interface 58 for example comprising a keyboard and/or mouse and a user display 62. There may also be an optional camera 64 which may be used when a barcode or similar readable version of the validation challenge is created as described above in relation to step S210 of FIG. 2b. The code and/or data stored in memory 54 may be provided on a removable storage medium 60.

For the Validation Device, the input/output system 56 may be used to receive the validation challenge or alternatively, the camera 64 may be used to capture the validation challenge from a barcode being displayed on the Initial Transaction device. The processor 52 may be used to regenerate message M' from the validation challenge and the user display 62 may be used to display message M'. The user interface 58 may then be used by a user to approve the message M' if it is correct and to calculate a validation code. The display 62 may display the validation code to the user and the input/output system 56 may communicate this validation code to the appropriate part of the system. The data stored in memory 54 may include the necessary shared secrets which are required for verification and/or decryption of any incoming data, e.g. a pair of secrets which are shared only with the local SCD in the arrangement of FIG. 4a or with the central authentication and validation server in the arrangements of FIGS. 2a and 3a. The pair of secrets, preferably comprises two different pieces of information, one for decrypting and/or verifying the incoming validation challenge to regenerate the message M' and one for generating the validation code.

For the Initial Transaction Device, the user display 62 may be used to display original message M and the user interface 58 may then be used by a user to request signature for the message M. The user display 62 may be also be used to display the validation challenge, e.g. in the form of a barcode. The user interface 58 may be used to input the validation code so that the validation code may be transmitted to the signature creation device.

Figure 5B:
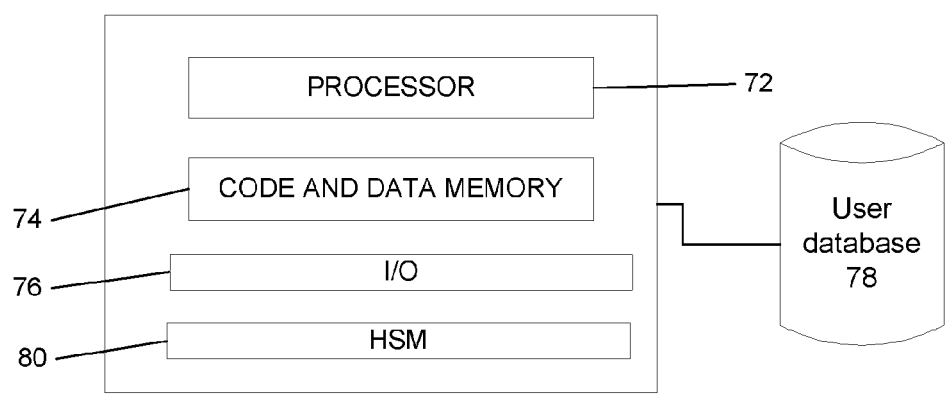
FIG. 5b is a schematic block diagram showing the components of a central authentication and validation server or a signature creation device.

FIG. 5b schematically shows the components of either the signature creation device (local or central) or the central authentication and validation server. Each comprises a processor 72 coupled to code and data memory 74 and an input/output system 76 (for example comprising interfaces for a network and/or storage media and/or other communications). The code and/or data stored in memory 74 may be provided on a removable storage medium. The device also comprises a user database 78 which comprises the pair of secrets shared with the validation device. The user database is shown as a separate component but may be integrated into the same device. The device also comprises a hardware security module 80. The HSM may be used to protect and use the signature keys in case of the SCD. The HSM may be used to protect and use the keys protecting the validation challenge and code in the Authentication and Validation Server.

In the arrangements of FIGS. 2a and 3a, the processor 72 for the central authentication and validation server may generate the validation challenge and the input/output system may send it to the validation device. A validation code may be received via the input/output system 76 and verified by the processor 72. The results of the verification may then be sent to the signature creation device.

In all arrangements, for the signature creation device, the processor 72 may create the signature using private information stored in the user database 78. Furthermore, in the arrangements of FIG. 4a, the processor 72 for the signature creation device may generate the validation challenge and the input/output system 76 may send it to the validation device. A validation code may be received via the input/output system 76 and verified by the processor 72.

FIG. 5b shows a single computing device with multiple internal components which may be implemented from a single or multiple central processing units, e.g. microprocessors. It will be appreciated that the functionality of the device may be distributed across several computing devices. It will also be appreciated that the individual components may be combined into one or more components providing the combined functionality. Moreover, any of the modules, databases or devices shown in FIG. 5b may be implemented in a general purpose computer modified (e.g. programmed or configured) by software to be a special-purpose computer to perform the functions described herein.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A computer implemented method of generating a digital signature on behalf of a user, the method comprising:
   receiving, via an input-output system, a request from a first user device of said user to create a digital signature for a first message M to verify its authenticity;
   generating, using a processor, a validation challenge using a second message M' which is based on the first message M and a first secret shared with said user, wherein said validation challenge is generated by encrypting said second message M' using said first shared secret;
   sending, via the input-output system, said validation challenge to said user to enable a second user device of said user to regenerate said second message M';
   accessing a first shared secret from a database;
   receiving, via the input-output system, a validation code from said second user device, said validation code confirming the request to create the digital signature and said validation code being generated following confirmation from the user that the second message M' as displayed on the second user device corresponds to the first message M, wherein the second message M' displayed on the second user device is generated by decrypting said validation challenge using said first shared secret; and generating, using said processor, the digital signature for the user for the first message M based on a successful verification of the validation code.

2. The method of claim 1, wherein said second message M' is identical to said first message M.

3. The method of claim 1, further comprising reformatting the validation challenge as a barcode which is readable by the second user device and sending the reformatted validation challenge to the user.

4. The method of claim 1, further comprising verifying the validation code prior to generating the digital signature.

5. The method of claim 1, wherein the validation code is verified using a second shared secret.

6. The method of claim 5, wherein the second shared secret is different to the first shared secret.

7. The method of claim 1, further comprising preregistering with the second user device to obtain the first shared secret and/or second shared secret.

8. A computer implemented method of generating a digital signature on behalf of a user, the method comprising:
displaying a first message M on a display of a first user device of said user;
sending a request from said first user device to a signature server to create a digital signature for said first message M to verify its authenticity;
creating a second message M' which is based on the first message M;
accessing a first shared secret from a database;
generating a validation challenge, using a processor on said signature server, using said second message M' and a first secret shared between said user and said signature server, wherein said validation challenge is generated by encrypting said second message M' using said first shared secret;
sending said validation challenge via an input-output system on said signature server to a second user device of said user;
regenerating said second message M' on said second user device using said first shared secret wherein said second message M' is generated by decrypting said validation challenge using said first shared secret;
displaying said second message M' on a display of said second user device;
receiving user confirmation via a user interface on said second user device that the displayed second message M' corresponds to said first message M;
generating a validation code confirming the request to create the digital signature;
sending said validation code from said second user device to said signature server; and
generating, using said processor, the digital signature for the user for the first message M based on a successful verification of the validation code.

9. The method of claim 8, further comprising verifying the validation code prior to generating the digital signature.

10. A signature server for creating a digital signature on behalf of a user, the server being configured to:
receive, via an input-output system, a request from a first user device of said user to create a digital signature for a first message M to verify its authenticity;
generate, using a processor, a validation challenge using a second message M' which is based on the first message M and a first secret shared with said user, wherein said validation challenge is generated by encrypting said second message M' using said first shared secret;
send, via the input-output system, said validation challenge to said user to enable a second user device of said user to regenerate said second message M';
access a first shared secret from a database;
receive, via the input-output system, a validation code from said second user device, said validation code confirming the request to create the digital signature and said validation code being generated following confirmation from the user that the second message M' as displayed on the second user device corresponds to the first message M, wherein the second message M' displayed on the second user device is generated by decrypting said validation challenge using said first shared secret; and
generate, using said processor, the digital signature for the user for the first message M based on a successful verification of the validation code.

11. The signature server according to claim 10, comprising a signature creation device to generate the digital signature for the user.

12. The signature server according to claim 11, wherein the signature creation device is local to the user.

13. The signature server according to claim 11, wherein the signature creation device generates the validation challenge.

14. The signature server according to claim 13, wherein the signature creation device and the second user device both store the first shared secret.

15. The signature server according to claim 10, comprising an authentication and validation server to generate the validation challenge.

16. The signature server according to claim 15, wherein the authentication and validation server and the second user device both store the first shared secret.

17. The signature server according to claim 15, wherein the authentication and validation server is remote from the user.

18. A system comprising a signature server, an initial transaction device and a validation device, the initial transaction device being configured to:
display a first message M on a display on said initial transaction device of a user; and
send, via an input-output system, a request to the signature server to create a digital signature for said first message M to verify its authenticity;
the signature server being configured to:
generate, using a processor on said signature server, a validation challenge using a second message M' which is based on said first message M and a first secret shared between said user and said signature server, wherein said validation challenge is generated by encrypting said second message M' using said first shared secret; and
send, via said input-output system, said validation challenge to the validation device of the user;
the validation device being configured to:
regenerate, using a processor on said validation device, said second message M' using said first shared secret wherein said second message M' is generated by decrypting said validation challenge using said first shared secret;
display said second message M' on a display on said validation device;

receive, via said input-output system, user confirmation that the displayed second message M' corresponds to said first message M;
generate, via said processor on said validation device, a validation code confirming the request to create the digital signature; and
send, via said input-output system, said validation code to said signature server;
whereby said signature server generates, via said processor on said signature server, the digital signature for the user for the first message M based on a successful verification of the validation code.

\* \* \* \* \*